(12) United States Patent
Pleiman et al.

(10) Patent No.: US 12,417,262 B2
(45) Date of Patent: Sep. 16, 2025

(54) SYSTEMS AND METHODS FOR 3D PRINTING OF LIMITED EDITION VIRTUAL ITEMS

(71) Applicant: DISH Network L.L.C., Englewood, CO (US)

(72) Inventors: Eric C. Pleiman, Englewood, CO (US); Jesus Flores Guerra, Englewood, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 305 days.

(21) Appl. No.: 17/949,088

(22) Filed: Sep. 20, 2022

(65) Prior Publication Data

US 2024/0095312 A1    Mar. 21, 2024

(51) Int. Cl.

| | | |
|---|---|---|
| G06F 21/10 | (2013.01) | |
| A63F 13/69 | (2014.01) | |
| A63F 13/85 | (2014.01) | |
| A63F 13/98 | (2014.01) | |
| B29C 64/386 | (2017.01) | |
| B33Y 50/00 | (2015.01) | |
| G06F 21/44 | (2013.01) | |
| G06F 21/60 | (2013.01) | |
| A63F 13/798 | (2014.01) | |

(52) U.S. Cl.
CPC ......... *G06F 21/1011* (2023.08); *A63F 13/69* (2014.09); *A63F 13/85* (2014.09); *A63F 13/98* (2014.09); *B29C 64/386* (2017.08); *B33Y 50/00* (2014.12); *G06F 21/10* (2013.01); *G06F 21/1078* (2023.08); *G06F 21/44* (2013.01); *G06F 21/608* (2013.01); *A63F 13/798* (2014.09); *A63F 2300/558* (2013.01); *G06F 21/1015* (2023.08)

(58) Field of Classification Search
None
See application file for complete search history.

(56) References Cited

U.S. PATENT DOCUMENTS 5,956,028 A * 9/1999 Matsui ............... H04N 7/15
348/E7.083
5,956,038 A * 9/1999 Rekimoto ............ A63F 13/352
345/419

(Continued)

OTHER PUBLICATIONS

US 12,090,671 B2, 09/2024, Cella (withdrawn)*

(Continued)

*Primary Examiner* — Luu T Pham
*Assistant Examiner* — James J Wilcox
(74) *Attorney, Agent, or Firm* — Seed Intellectual Property Law Group LLP

(57) ABSTRACT

A 3D printing system and method for limited edition virtual objects is disclosed. The method including: enabling a user to obtain a limited edition virtual object associated with an activity of the user in a virtual environment; receiving a request from the user to 3D print the limited edition virtual object; preparing a 3D printer file of the limited edition virtual object requested by the user; sending the 3D printer file of the limited edition virtual object to a 3D printer to be printed; and validating authenticity of transformation of the limited edition virtual object into a 3D printed tangible physical item.

14 Claims, 6 Drawing Sheets

(56) References Cited

U.S. PATENT DOCUMENTS

| | | | | |
|---|---|---|---|---|
| 6,144,745 | A * | 11/2000 | Akiyama | G11B 20/0021<br>380/232 |
| 6,181,346 | B1 * | 1/2001 | Ono | G06T 11/40<br>345/506 |
| 6,222,583 | B1 * | 4/2001 | Matsumura | G01C 21/3673<br>348/113 |
| 6,378,974 | B1 * | 4/2002 | Oelbrandt | B41M 5/5236<br>347/100 |
| 6,434,255 | B1 * | 8/2002 | Harakawa | G06F 3/0304<br>348/169 |
| 6,490,496 | B1 * | 12/2002 | Dacey | B29C 64/112<br>700/118 |
| 6,490,498 | B1 * | 12/2002 | Takagi | G05B 19/4097<br>700/118 |
| 6,625,618 | B1 * | 9/2003 | Arai | B64F 5/60 |
| 6,734,847 | B1 * | 5/2004 | Baldeweg | G06T 19/00<br>345/419 |
| 6,856,907 | B2 * | 2/2005 | Rosenblum | G06Q 10/10<br>702/5 |
| 6,980,926 | B1 * | 12/2005 | O'Brien, Jr. | G06F 18/00<br>702/179 |
| 7,249,005 | B2 * | 7/2007 | Loberg | G06T 15/50<br>345/581 |
| 7,710,560 | B2 * | 5/2010 | Holub | G01J 3/463<br>356/300 |
| 7,839,549 | B2 * | 11/2010 | Mihajlovic | G02B 30/27<br>359/23 |
| 8,335,784 | B2 * | 12/2012 | Gutt | G06F 16/90335<br>715/825 |
| 8,784,206 | B1 * | 7/2014 | Gronkowski | G07F 17/3211<br>463/32 |
| 8,994,726 | B1 * | 3/2015 | Furukawa | G06T 17/10<br>345/420 |
| 9,536,352 | B2 * | 1/2017 | Anderson | G06K 17/0016 |
| 9,672,389 | B1 * | 6/2017 | Mosterman | G06F 30/20 |
| 10,466,668 | B2 * | 11/2019 | Sato | G05B 19/4099 |
| 10,595,100 | B2 * | 3/2020 | Lee | H04N 21/4782 |
| 10,650,912 | B2 * | 5/2020 | Schnall-Levin | G16B 50/30 |
| 10,922,697 | B2 * | 2/2021 | Neilson | G06Q 30/018 |
| 10,932,890 | B1 * | 3/2021 | Sant | A61C 13/0004 |
| 10,973,440 | B1 * | 4/2021 | Martin | G06T 13/40 |
| 11,009,336 | B2 * | 5/2021 | Lu | G01J 9/0215 |
| 11,308,687 | B1 * | 4/2022 | Liang | G06T 13/40 |
| 11,500,346 | B2 * | 11/2022 | Valin | F24S 23/77 |
| 11,504,029 | B1 * | 11/2022 | Martin | H04W 4/027 |
| 11,609,242 | B1 * | 3/2023 | Martin | G01P 13/00 |
| 11,654,633 | B2 * | 5/2023 | Bigos | B29C 64/393<br>700/98 |
| 11,747,634 | B1 * | 9/2023 | Mullins | G02B 27/017<br>345/633 |
| 12,095,804 | B2 * | 9/2024 | Meunier | H04L 63/1441 |
| 12,177,369 | B1 * | 12/2024 | Azarenko | H04L 9/50 |
| 12,307,405 | B2 * | 5/2025 | Singhal | G06F 30/27 |
| 2002/0065747 | A1 * | 5/2002 | Nagano | G06Q 30/06<br>715/255 |
| 2002/0082942 | A1 * | 6/2002 | Shimazu | G06T 17/05<br>705/27.2 |
| 2002/0090058 | A1 * | 7/2002 | Yasuda | A61B 6/4464<br>378/205 |
| 2002/0150941 | A1 * | 10/2002 | Gojobori | G06G 7/48<br>703/11 |
| 2003/0107568 | A1 * | 6/2003 | Urisaka | G06T 17/00<br>345/419 |
| 2003/0112259 | A1 * | 6/2003 | Kinjo | H04N 1/00307<br>348/E7.081 |
| 2003/0225766 | A1 * | 12/2003 | Furumoto | G06F 21/6218<br>707/999.009 |
| 2004/0003142 | A1 * | 1/2004 | Yokota | G06Q 10/02<br>710/1 |
| 2004/0046779 | A1 * | 3/2004 | Asano | G06T 7/73<br>715/716 |
| 2004/0073469 | A1 * | 4/2004 | Emori | G06Q 10/0875<br>700/97 |
| 2004/0215469 | A1 * | 10/2004 | Fukushima | G06Q 30/0601<br>705/26.1 |
| 2004/0263881 | A1 * | 12/2004 | Ito | H04N 1/6058<br>358/1.9 |
| 2005/0240499 | A1 * | 10/2005 | Morita | G06Q 10/0875<br>705/29 |
| 2006/0041523 | A1 * | 2/2006 | Karube | G06Q 10/10 |
| 2006/0267976 | A1 * | 11/2006 | Saito | H04N 19/423<br>345/419 |
| 2007/0156540 | A1 * | 7/2007 | Koren | G06Q 30/0643<br>705/14.51 |
| 2007/0218426 | A1 * | 9/2007 | Quadling | A61C 5/77<br>433/223 |
| 2008/0021877 | A1 * | 1/2008 | Saito | G16H 30/20 |
| 2008/0069458 | A1 * | 3/2008 | Vega-Higuera | G06T 15/08<br>382/232 |
| 2008/0140446 | A1 * | 6/2008 | Rosenfeld | G16H 30/20<br>705/2 |
| 2008/0181637 | A1 * | 7/2008 | Toda | G03G 15/5087<br>399/45 |
| 2008/0292179 | A1 * | 11/2008 | Busch | A61B 5/1038<br>382/154 |
| 2008/0303814 | A1 * | 12/2008 | Ishiyama | G06V 40/172<br>375/E7.243 |
| 2008/0306773 | A1 * | 12/2008 | Rosenfeld | G16H 40/67<br>705/3 |
| 2009/0034685 | A1 * | 2/2009 | Ohtsuka | G06T 7/0012<br>378/98.2 |
| 2009/0109216 | A1 * | 4/2009 | Uetabira | G06F 16/9577<br>345/419 |
| 2009/0298017 | A1 * | 12/2009 | Boerjes | G06T 1/0007<br>433/214 |
| 2010/0067809 | A1 * | 3/2010 | Kawata | G06F 16/5862<br>382/224 |
| 2010/0134611 | A1 * | 6/2010 | Naruoka | G06V 40/11<br>382/103 |
| 2011/0112934 | A1 * | 5/2011 | Ishihara | G06T 17/00<br>715/782 |
| 2011/0144850 | A1 * | 6/2011 | Jikihara | G05D 1/0246<br>701/26 |
| 2011/0320813 | A1 * | 12/2011 | Suginaka | H04L 63/08<br>713/168 |
| 2012/0105903 | A1 * | 5/2012 | Pettis | G06F 3/1226<br>358/1.14 |
| 2013/0073430 | A1 * | 3/2013 | Gallen | G06Q 30/06<br>705/26.41 |
| 2013/0226528 | A1 * | 8/2013 | Hodgins | B33Y 50/00<br>703/1 |
| 2013/0230036 | A1 * | 9/2013 | Reznik | H04L 67/51<br>370/338 |
| 2014/0022258 | A1 * | 1/2014 | Rogel | G06T 11/20<br>345/441 |
| 2014/0168212 | A1 * | 6/2014 | Jones | G06T 7/579<br>345/420 |
| 2014/0222667 | A1 * | 8/2014 | Abhyanker | H04L 51/52<br>726/28 |
| 2014/0280269 | A1 * | 9/2014 | Schultz | G06F 16/29<br>707/758 |
| 2014/0365993 | A1 * | 12/2014 | Rath | A63F 13/213<br>717/105 |
| 2015/0058175 | A1 * | 2/2015 | Axt | H04N 21/4627<br>705/26.81 |
| 2015/0070352 | A1 * | 3/2015 | Jones | G06T 7/579<br>345/420 |
| 2015/0128104 | A1 * | 5/2015 | Rath | G06F 8/34<br>717/105 |
| 2015/0248678 | A1 * | 9/2015 | Wee | G06Q 10/08<br>705/318 |
| 2015/0253761 | A1 * | 9/2015 | Nelson | G06F 21/608<br>700/98 |
| 2015/0273342 | A1 * | 10/2015 | Olson | G06Q 30/0202<br>463/43 |
| 2015/0339283 | A1 * | 11/2015 | Burson | G06F 3/0484<br>715/227 |

(56) References Cited

U.S. PATENT DOCUMENTS

| | | | |
|---|---|---|---|
| 2015/0352885 A1* | 12/2015 | Wee | B42D 25/485 |
| | | | 235/492 |
| 2015/0375455 A1* | 12/2015 | Williams | G06V 20/80 |
| | | | 700/119 |
| 2015/0378353 A1* | 12/2015 | Williams | G05B 19/4183 |
| | | | 700/119 |
| 2016/0067927 A1* | 3/2016 | Voris | B29C 64/386 |
| | | | 700/98 |
| 2016/0121547 A1* | 5/2016 | Kobayashi | B29C 64/135 |
| | | | 425/145 |
| 2016/0132275 A1* | 5/2016 | Mackowiak | G06F 3/1206 |
| | | | 463/32 |
| 2016/0171354 A1* | 6/2016 | Glasgow | G06Q 30/0207 |
| | | | 358/1.14 |
| 2016/0226308 A1* | 8/2016 | Valin | H02S 40/22 |
| 2016/0259866 A1* | 9/2016 | Bigos | G06T 17/20 |
| 2016/0271881 A1* | 9/2016 | Bostick | G05B 15/02 |
| 2016/0310861 A1* | 10/2016 | Hirata | A63H 33/086 |
| 2016/0314617 A1* | 10/2016 | Forster | G06T 19/20 |
| 2016/0364790 A1* | 12/2016 | Lanpher | G06Q 30/0601 |
| 2016/0375353 A1* | 12/2016 | Boulding | A63F 9/1208 |
| | | | 273/157 R |
| 2017/0032574 A1 | 2/2017 | Sugaya | H04L 67/04 |
| 2017/0057170 A1* | 3/2017 | Gupta | G05B 19/4099 |
| 2017/0173289 A1* | 6/2017 | Lucey | A61M 16/06 |
| 2017/0173889 A1* | 6/2017 | Thomas-Lepore | H04L 51/046 |
| 2017/0213210 A1* | 7/2017 | Kravitz | G06Q 20/3829 |
| 2017/0218660 A1* | 8/2017 | Muchna | G06K 19/10 |
| 2017/0228512 A1* | 8/2017 | Driscoll | G16H 20/10 |
| 2017/0266558 A1* | 9/2017 | Rath | A63F 13/60 |
| 2017/0374347 A1* | 12/2017 | Jiang | H04N 19/182 |
| 2018/0005456 A1* | 1/2018 | Vijayaraghavan | G06F 16/51 |
| 2018/0030175 A1* | 2/2018 | Miura | C08F 8/00 |
| 2018/0031662 A1* | 2/2018 | Markl | G01R 33/56325 |
| 2018/0096175 A1* | 4/2018 | Schmeling | G06F 1/3206 |
| 2018/0116272 A1* | 5/2018 | Hardee | A23P 30/00 |
| 2018/0194083 A1* | 7/2018 | Bouwmeester | B33Y 40/20 |
| 2018/0349676 A1* | 12/2018 | Gibson | G06V 40/30 |
| 2018/0350101 A1* | 12/2018 | Glover | G06T 7/55 |
| 2019/0101895 A1* | 4/2019 | Casey | G05B 19/4099 |
| 2019/0102815 A1* | 4/2019 | Norman | G06Q 30/06 |
| 2019/0102986 A1* | 4/2019 | Nelson | G06F 3/04815 |
| 2019/0108578 A1* | 4/2019 | Spivack | G09B 5/065 |
| 2019/0134910 A1* | 5/2019 | Casey | G06F 21/608 |
| 2019/0139178 A1* | 5/2019 | Cook | G06F 3/1222 |
| 2019/0143639 A1* | 5/2019 | Ishiwata | E04B 1/80 |
| | | | 428/339 |
| 2019/0144676 A1* | 5/2019 | Ishiwata | C08L 33/06 |
| | | | 526/72 |
| 2019/0147583 A1* | 5/2019 | Stefan | G06T 7/0002 |
| | | | 345/419 |
| 2019/0163685 A1* | 5/2019 | Aboutaam | G06F 21/602 |
| 2019/0180291 A1* | 6/2019 | Schmeling | G16H 20/10 |
| 2019/0211178 A1* | 7/2019 | Ueda | C08K 3/042 |
| 2019/0253254 A1* | 8/2019 | Brownlee | G06K 19/0725 |
| 2019/0270251 A1* | 9/2019 | Nagai | B29C 64/386 |
| 2019/0270923 A1* | 9/2019 | Ueda | C08L 23/0815 |
| 2019/0333284 A1* | 10/2019 | Abunojaim | B29C 64/386 |
| 2019/0385100 A1* | 12/2019 | Zaman | G06F 17/16 |
| 2020/0003743 A1* | 1/2020 | van Schriek | G06T 19/00 |
| 2020/0005281 A1* | 1/2020 | Patel | G06Q 20/0655 |
| 2020/0015830 A1* | 1/2020 | Bonin, Jr. | A61B 17/15 |
| 2020/0050342 A1* | 2/2020 | Lee | G06F 3/03542 |
| 2020/0101788 A1* | 4/2020 | Shimazaki | B44C 3/085 |
| 2020/0129066 A1* | 4/2020 | Gedamu | A61B 5/1072 |
| 2020/0135310 A1* | 4/2020 | Gedamu | G16H 50/20 |
| 2020/0159871 A1* | 5/2020 | Bowen | G06T 11/60 |
| 2020/0160611 A1* | 5/2020 | Gertenbach | G06F 3/011 |
| 2020/0167845 A1* | 5/2020 | Glasgow | G06Q 30/0207 |
| 2020/0184547 A1* | 6/2020 | Andon | G06Q 30/0209 |
| 2020/0201294 A1* | 6/2020 | Nelson | G06F 21/602 |
| 2020/0234486 A1* | 7/2020 | Bigos | B33Y 50/00 |
| 2020/0273048 A1* | 8/2020 | Andon | G06Q 10/02 |
| 2020/0326683 A1* | 10/2020 | Oligschlaeger | G06F 21/608 |
| 2020/0380780 A1* | 12/2020 | Lysenkov | G06N 3/08 |
| 2021/0014182 A1* | 1/2021 | Stafford | H04W 8/26 |
| 2021/0082044 A1* | 3/2021 | Sliwka | H04L 9/3255 |
| 2021/0092417 A1* | 3/2021 | Sugio | H04N 19/192 |
| 2021/0103938 A1* | 4/2021 | Bulawski | H04L 63/0853 |
| 2021/0106117 A1* | 4/2021 | Brilland | A45D 34/045 |
| 2021/0201571 A1* | 7/2021 | State | G06F 30/17 |
| 2021/0211632 A1* | 7/2021 | Kawakami | H04N 13/117 |
| 2021/0233330 A1* | 7/2021 | Sutherland | G06F 3/011 |
| 2021/0241106 A1* | 8/2021 | Mehr | G06N 3/088 |
| 2021/0248594 A1* | 8/2021 | Yantis | G06Q 20/326 |
| 2021/0258144 A1* | 8/2021 | Minier | G06K 19/06037 |
| 2021/0264079 A1* | 8/2021 | Mehr | G06F 30/23 |
| 2021/0271229 A1* | 9/2021 | Molcho | G05B 19/4183 |
| 2021/0357489 A1* | 11/2021 | Tali | G06F 16/2379 |
| 2021/0357542 A1* | 11/2021 | Bowen | G06Q 30/0621 |
| 2022/0021633 A1* | 1/2022 | Stafford | H04W 4/12 |
| 2022/0027720 A1* | 1/2022 | Lysenkov | G06N 3/08 |
| 2022/0038870 A1* | 2/2022 | Stafford | H04W 4/14 |
| 2022/0055269 A1* | 2/2022 | Mortensen | B29D 35/0018 |
| 2022/0058633 A1* | 2/2022 | Yantis | G06Q 20/4016 |
| 2022/0075845 A1* | 3/2022 | Bowen | G06F 30/30 |
| 2022/0104584 A1* | 4/2022 | Bazan | A43B 3/244 |
| 2022/0109562 A1* | 4/2022 | Feola | H04L 63/0272 |
| 2022/0113690 A1* | 4/2022 | Seifert | G06Q 50/06 |
| 2022/0114552 A1* | 4/2022 | Seifert | G06F 30/12 |
| 2022/0130098 A1* | 4/2022 | Hunter | G06T 13/40 |
| 2022/0180601 A1* | 6/2022 | Iwaki | A63F 13/25 |
| 2022/0187847 A1* | 6/2022 | Cella | G06Q 10/06 |
| 2022/0197306 A1* | 6/2022 | Cella | G06N 3/088 |
| 2022/0230240 A1* | 7/2022 | Sliwka | G06Q 40/02 |
| 2022/0242050 A1* | 8/2022 | Kim | G06Q 50/04 |
| 2022/0245574 A1* | 8/2022 | Cella | G06Q 10/087 |
| 2022/0279893 A1* | 9/2022 | Hansen | B33Y 80/00 |
| 2022/0284447 A1* | 9/2022 | Bulawski | G06K 19/07758 |
| 2022/0294630 A1* | 9/2022 | Collen | H04L 9/3213 |
| 2022/0309491 A1* | 9/2022 | Shapiro | G06F 21/64 |
| 2022/0309602 A1* | 9/2022 | Okabe | G06T 7/0008 |
| 2022/0340166 A1* | 10/2022 | Kume | G08G 1/0133 |
| 2022/0348363 A1* | 11/2022 | Colson | B65B 65/003 |
| 2022/0351195 A1* | 11/2022 | Quigley | H04L 9/50 |
| 2022/0358430 A1* | 11/2022 | Seifert | G06Q 10/0639 |
| 2022/0394058 A1* | 12/2022 | Meunier | H04L 63/1441 |
| 2023/0078448 A1* | 3/2023 | Cella | G06Q 10/10 |
| | | | 705/7.13 |
| 2023/0079195 A1* | 3/2023 | Matheson | G06Q 20/0655 |
| | | | 705/44 |
| 2023/0083724 A1* | 3/2023 | Cella | G06Q 20/389 |
| | | | 705/28 |
| 2023/0090253 A1* | 3/2023 | Meadows | H04L 67/12 |
| | | | 345/419 |
| 2023/0098602 A1* | 3/2023 | Cella | B29C 64/386 |
| | | | 700/248 |
| 2023/0102048 A1* | 3/2023 | Cella | B25J 9/1661 |
| | | | 700/248 |
| 2023/0117135 A1* | 4/2023 | Quigley | G06Q 20/3678 |
| | | | 705/65 |
| 2023/0117430 A1* | 4/2023 | Quigley | G06Q 50/12 |
| | | | 705/65 |
| 2023/0117725 A1* | 4/2023 | Quigley | G06Q 20/326 |
| | | | 705/65 |
| 2023/0117801 A1* | 4/2023 | Quigley | G06Q 20/0655 |
| | | | 705/65 |
| 2023/0118213 A1* | 4/2023 | Quigley | G06Q 20/40 |
| | | | 705/65 |
| 2023/0118717 A1* | 4/2023 | Quigley | G06Q 20/40 |
| | | | 705/65 |
| 2023/0119584 A1* | 4/2023 | Quigley | G06F 21/64 |
| | | | 705/65 |
| 2023/0121779 A1* | 4/2023 | Quigley | G06Q 20/38215 |
| | | | 705/65 |
| 2023/0123322 A1* | 4/2023 | Cella | G06Q 30/0202 |
| | | | 700/29 |
| 2023/0123346 A1* | 4/2023 | Quigley | G06Q 20/342 |
| | | | 705/65 |
| 2023/0123865 A1* | 4/2023 | Quigley | G06Q 20/389 |
| | | | 705/65 |

(56) References Cited

U.S. PATENT DOCUMENTS

| | | | |
|---|---|---|---|
| 2023/0124040 A1* | 4/2023 | Quigley | G06F 21/602 705/65 |
| 2023/0124608 A1* | 4/2023 | Quigley | G06F 21/602 705/65 |
| 2023/0124806 A1* | 4/2023 | Quigley | G06Q 20/367 705/65 |
| 2023/0129494 A1* | 4/2023 | Quigley | G06Q 20/123 705/65 |
| 2023/0130594 A1* | 4/2023 | Quigley | G06Q 20/40 705/65 |
| 2023/0131603 A1* | 4/2023 | Quigley | G06Q 20/38215 705/65 |
| 2023/0173395 A1* | 6/2023 | Cella | G06N 3/0475 463/25 |
| 2023/0188485 A1* | 6/2023 | Stafford | H04W 4/14 |
| 2023/0196341 A1* | 6/2023 | Quigley | G06Q 30/0631 705/65 |
| 2023/0206329 A1* | 6/2023 | Cella | G06Q 20/3674 |
| 2023/0214925 A1* | 7/2023 | Cella | G06Q 30/06 705/37 |
| 2023/0222454 A1* | 7/2023 | Cella | G06N 7/01 705/28 |
| 2023/0222531 A1* | 7/2023 | Cella | G06Q 10/06375 705/7.31 |
| 2023/0245101 A1* | 8/2023 | Quigley | G06Q 20/38215 705/65 |
| 2023/0259336 A1* | 8/2023 | Asanuma | G06F 8/35 717/104 |
| 2023/0259692 A1* | 8/2023 | Wright | G06F 40/56 704/9 |
| 2023/0267183 A1* | 8/2023 | Atwood | G06F 3/1222 726/26 |
| 2023/0274244 A1* | 8/2023 | Quigley | G06F 21/602 705/65 |
| 2023/0274245 A1* | 8/2023 | Quigley | G06Q 20/02 705/65 |
| 2023/0281042 A1* | 9/2023 | Khinvasara | G06N 5/04 718/104 |
| 2023/0297971 A1* | 9/2023 | Tillema | G06Q 10/20 705/305 |
| 2023/0298116 A1* | 9/2023 | Dailey | G06Q 10/20 705/314 |
| 2023/0298291 A1* | 9/2023 | Zhao | G06T 15/08 345/424 |
| 2023/0302286 A1* | 9/2023 | Doguet | A61N 1/36142 |
| 2023/0302364 A1* | 9/2023 | Rodriguez | G06Q 30/0185 |
| 2023/0305523 A1* | 9/2023 | Moroney | B29C 64/386 |
| 2023/0308283 A1* | 9/2023 | Abad | H04L 63/12 |
| 2023/0334393 A1* | 10/2023 | Seifert | G06F 30/12 |
| 2023/0342838 A1* | 10/2023 | Ho | G06Q 30/0643 |
| 2023/0350641 A1* | 11/2023 | Tessari | G06F 7/582 |
| 2023/0351369 A1* | 11/2023 | Lee | G06Q 20/3674 |
| 2023/0351484 A1* | 11/2023 | Lee | G06Q 20/12 |
| 2023/0351680 A1* | 11/2023 | Helfgott | H04L 9/50 |
| 2023/0353570 A1* | 11/2023 | Lee | H04L 63/10 |
| 2023/0360032 A1* | 11/2023 | Lee | H04L 63/10 |
| 2023/0360317 A1* | 11/2023 | Wang | G06T 15/205 |
| 2023/0360328 A1* | 11/2023 | Gao | G06T 15/205 |
| 2024/0005294 A1* | 1/2024 | Ho | G06Q 10/0633 |
| 2024/0013202 A1* | 1/2024 | Bacon | G06F 21/64 |
| 2024/0015030 A1* | 1/2024 | Cameron | H04L 9/50 |
| 2024/0020772 A1* | 1/2024 | Lambert | G07F 17/3276 |
| 2024/0062178 A1* | 2/2024 | McDonnell | G06Q 30/018 |
| 2024/0065358 A1* | 2/2024 | Jakubowski | A41F 1/002 |
| 2024/0078536 A1* | 3/2024 | Dashkov | G06Q 20/36 |
| 2024/0086382 A1* | 3/2024 | Soon-Shiong | G06F 16/22 |
| 2024/0086384 A1* | 3/2024 | Soon-Shiong | G06F 16/2255 |
| 2024/0091610 A1* | 3/2024 | McDonnell | G06Q 20/3674 |
| 2024/0091646 A1* | 3/2024 | McDonnell | A63F 13/573 |
| 2024/0095312 A1* | 3/2024 | Pleiman | B33Y 50/00 |
| 2024/0095700 A1* | 3/2024 | McDonnell | G06Q 30/0224 |
| 2024/0099422 A1* | 3/2024 | Narriman | A43B 13/183 |
| 2024/0144141 A1* | 5/2024 | Cella | G06Q 30/0206 |
| 2024/0144576 A1* | 5/2024 | Aizawa | G08G 5/26 |
| 2024/0185229 A1* | 6/2024 | Dashkov | G06Q 30/0207 |
| 2024/0192695 A1* | 6/2024 | Klingensmith | G01C 21/1652 |
| 2024/0211847 A1* | 6/2024 | Nagao | G06Q 10/083 |
| 2024/0214509 A1* | 6/2024 | Reddy | B64U 20/87 |
| 2024/0222718 A1* | 7/2024 | Medeirosman | G06K 15/021 |
| 2024/0223807 A1* | 7/2024 | Xu | H04N 19/70 |
| 2024/0232561 A1* | 7/2024 | Khadjavi | G06K 19/06037 |
| 2024/0242287 A1* | 7/2024 | Rice | G06F 3/04815 |
| 2024/0242428 A1* | 7/2024 | Ackerman | G06F 40/166 |
| 2024/0252890 A1* | 8/2024 | Roach | A63B 53/04 |
| 2024/0259272 A1* | 8/2024 | Mathur | H04L 41/145 |
| 2024/0261692 A1* | 8/2024 | Sliwka | H04L 9/3213 |
| 2024/0264996 A1* | 8/2024 | Soon-Shiong | G06F 16/27 |
| 2024/0272258 A1* | 8/2024 | Wang | G01R 33/5615 |
| 2024/0280535 A1* | 8/2024 | Ham | G01N 27/302 |
| 2024/0288483 A1* | 8/2024 | Ramsey | H02B 1/48 |
| 2024/0297963 A1* | 9/2024 | Mccaffrey | G06T 7/262 |
| 2024/0326339 A1* | 10/2024 | Silverstein | G06Q 30/0621 |
| 2024/0330902 A1* | 10/2024 | Dashkov | G06Q 20/367 |
| 2024/0399666 A1* | 12/2024 | Fox | B33Y 30/00 |
| 2024/0412208 A1* | 12/2024 | Loreth | G06Q 20/3678 |
| 2024/0419414 A1* | 12/2024 | Pring | G06F 8/41 |
| 2025/0014282 A1* | 1/2025 | Odding | G06T 9/001 |
| 2025/0044860 A1* | 2/2025 | Lemay | G06F 3/0485 |
| 2025/0045589 A1* | 2/2025 | Rengasamy | G06N 3/045 |
| 2025/0045681 A1* | 2/2025 | Rowley | G06F 16/23 |
| 2025/0067867 A1* | 2/2025 | Nohara | G01S 13/46 |
| 2025/0071040 A1* | 2/2025 | Wang | G16Y 40/50 |
| 2025/0080688 A1* | 3/2025 | Kitabayashi | G06T 7/11 |
| 2025/0086690 A1* | 3/2025 | Wechsler | G06Q 30/0609 |
| 2025/0173724 A1* | 5/2025 | Silver | G06Q 20/4016 |

OTHER PUBLICATIONS

Teixeira et al "3D Printing as a Means for Augmenting Existing Surfaces," 2016 XVIII Symposium on Virtual and Augmented Reality , IEEE, pp. 24-28 (Year: 2016).*

Luo et al "YaRep: A Personal 3D Printing Simulator," 2014 International Conference on Virtual Reality and Visualization, IEEE Computer Society, pp. 408-411 (Year: 2014).*

3D-gART—A New Gachapon 3D-printed Toy Played with Augmented Reality and Story Narration, IEEE, pp. 533-536 (Year: 2022).*

Umair et al "An Online 3D Printing Portal for General and Medical Fields," IEEE, pp. 278-281 (Year: 2015).*

Luo et al YaRep: A Personal 3D Printing Simulator, IEEE Computer Society, pp. 408-411 (Year: 2014).*

* cited by examiner

SYSTEMS AND METHODS FOR 3D PRINTING OF LIMITED EDITION VIRTUAL ITEMS

TECHNICAL FIELD

The present disclosure relates generally to a 3D printing system and method, and more particularly, but not exclusively, to a 3D printing system and method for printing virtual items.

BACKGROUND

The proliferation of video games, as well as augmented and virtual reality environments appears to be growing at an ever increasing rate. These virtual gaming activities and virtual reality environment activities are extremely popular with both children and adults. Many of these video games and virtual activities enable users to collect or win virtual items, virtual awards, tournament awards, and badges, as well as acquired virtual clothing, gear, armor, and weapons for their avatar. Users play online games against other competitors in Xbox live, PlayStation live, Fortnite, and the like. Some of these games have tournaments weekly, monthly, or even daily. User of these games may achieve a virtual ranking or virtual trophies for being in the top 10, 5, 3, or 1.

BRIEF SUMMARY

The present disclosure is directed towards a system for 3D printing of limited edition virtual objects to safeguard against loss by account hacking or computer storage failure. In some embodiments, the memory is arranged to store computer instructions, and the computer instructions are executable by the processor. Accordingly, the computer instructions cause the processor to: enable a user to obtain a limited edition virtual object associated with an activity of the user in a virtual environment; receive a request from the user to 3D print the limited edition virtual object; communicate with a server that stores the limited edition virtual object associated with the activity of a user in the virtual environment; prepare a 3D printer file of the limited edition virtual object requested by the user; prevent duplication of the 3D printer file of the limited edition virtual object requested by the user; send the 3D printer file of the limited edition virtual object to a 3D printer to be printed; and validate authenticity of transformation of the limited edition virtual object into a 3D printed tangible physical item.

In some embodiments of the system for 3D printing of limited edition virtual objects, duplication of the 3D printer file of the limited edition virtual object is prevented using digital rights management. In another aspect of some embodiments, the system further causes the processor to create a non-fungible token of the limited edition virtual object that is associated with the 3D printed tangible physical item. In still another aspect of some embodiments, the 3D printed tangible physical item is printed with a QR code that when scanned shows that current ownership of the non-fungible token associated with the 3D printed tangible physical item. In yet another aspect of some embodiments, the 3D printed tangible physical item is associated with time, place, and number sequence information.

In a further aspect of some embodiments, the 3D printer file of the limited edition virtual object is obtained as a result of an award or accomplishment in a virtual environment. In an additional aspect of some embodiments, the 3D printed tangible physical item is associated with a certificate. In still another aspect of some embodiments, the limited edition virtual object may only be printed once into a 3D printed tangible physical item.

In other embodiments, one or more methods for 3D printing of limited edition virtual objects to safeguard against account hacking and computer storage failure are disclosed. The method includes: enabling a user to obtain a limited edition virtual object associated with an activity of the user in a virtual environment; receiving a request from the user to 3D print the limited edition virtual object; communicate with a server that stores the limited edition virtual object associated with the activity of a user in the virtual environment; preparing a 3D printer file of the limited edition virtual object requested by the user; preventing duplication of the 3D printer file of the limited edition virtual object requested by the user; sending the 3D printer file of the limited edition virtual object to a 3D printer to be printed; and validating authenticity of transformation of the limited edition virtual object into a 3D printed tangible physical item.

In some embodiments of the method for 3D printing of limited edition virtual objects, preventing duplication of the 3D printer file of the limited edition virtual object further comprises employing digital rights management of the 3D printer file of the limited edition virtual object. In another aspect of some embodiments, the method further comprises creating a non-fungible token of the limited edition virtual object that is associated with the 3D printed tangible physical item. In still another aspect of some embodiments, the method further comprises: printing a QR code of the 3D printed tangible physical item; and displaying current ownership of the non-fungible token associated with the 3D printed tangible physical item when the QR code is scanned. In yet another aspect of some embodiments, the method further comprises associating one or more of time, place, or number sequence information with the 3D printed tangible physical item.

In a further aspect of some embodiments, the method further comprises obtaining the 3D printer file of the limited edition virtual object as a result of an award or accomplishment in a virtual environment. In an additional aspect of some embodiments, the method further comprises associating the 3D printed tangible physical item with a certificate. In still another aspect of some embodiments, the method further comprises restricting the limited edition virtual object to only be printable once into the 3D printed tangible physical item.

Additionally, in other embodiments, one or more non-transitory computer-readable storage mediums are disclosed. The one or more non-transitory computer-readable storage mediums have computer-executable instructions stored thereon that, when executed by at least one processor, cause the at least one processor to: enable a user to obtain a limited edition virtual object associated with an activity of the user in a virtual environment; receive a request from the user to 3D print the limited edition virtual object; communicate with a server that stores the limited edition virtual object associated with the activity of a user in the virtual environment; prepare a 3D printer file of the limited edition virtual object requested by the user; prevent duplication of the 3D printer file of the limited edition virtual object requested by the user; send the 3D printer file of the limited edition virtual object to a 3D printer to be printed; and validate authenticity of transformation of the limited edition virtual object into a 3D printed tangible physical item.

In another aspect of some embodiments, the non-transitory computer-readable storage medium further causes the processor to create a non-fungible token of the limited edition virtual object that is associated with the 3D printed tangible physical item. In still another aspect of some embodiments, the 3D printed tangible physical item is printed with a QR code that when scanned shows that current ownership of the non-fungible token associated with the 3D printed tangible physical item. In yet another aspect of some embodiments, the 3D printed tangible physical item is associated with time, place, and number sequence information.

Thus, the inventors have realized and solved the technological problem that since these are virtual objects, they are completely virtual with security and accessibility in the real world. Without the benefits taught herein, it is difficult for a user that has obtained one of these virtual items or achieved one of these virtual awards to interact with it outside of the game or secure the virtual item or virtual award against loss outside of the video game or other virtual environment.

Further, the inventors also realized that such virtual items or virtual awards may be lost forever if a user has their computer system hacked or otherwise compromised by a cyber-criminal. Additionally, the virtual items or virtual awards may be lost forever if a user simply has their computer crash and become unrecoverable. Finally, the virtual items or virtual awards may be lost forever if a user is banned from the gaming platform, the gaming company goes bankrupt, or the game otherwise ceases to be accessible to the user. The present disclosure solves the need to protect the user from these types of cyber risks due to both intentional actions of third parties, as well as simply technological failures of the computing components.

These features with other technological improvements, which will become subsequently apparent, reside in the details of construction and operation as more fully described hereafter and claimed, reference being had to the accompanying drawings forming a part hereof.

BRIEF DESCRIPTION OF THE DRAWINGS

The present application will be more fully understood by reference to the following figures, which are for illustrative purposes only. The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Figure 1:
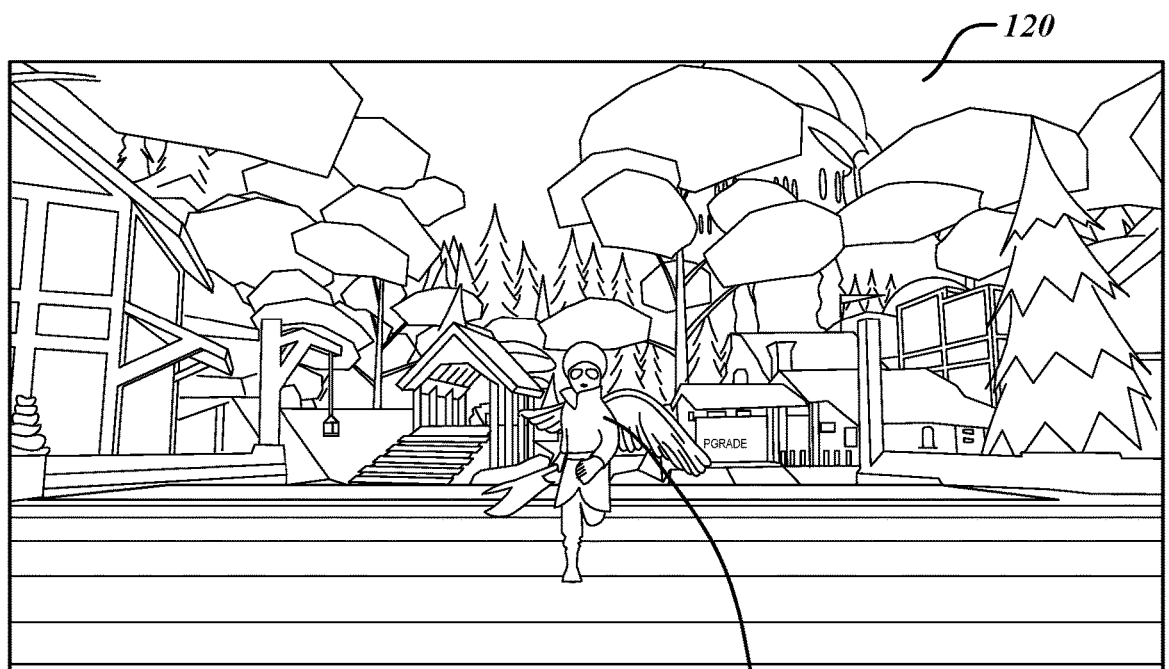
FIG. 1 illustrates an embodiment of a user engaging in an activity in a virtual environment 3D associated with a 3D printing system and method for limited edition virtual objects.

Persons of ordinary skill in the art will understand that the present disclosure is illustrative only and not in any way limiting. Other embodiments and various combinations of the presently disclosed system and method readily suggest themselves to such skilled persons having the assistance of this disclosure.

Each of the features and teachings disclosed herein can be utilized separately or in conjunction with other features and teachings to provide a 3D printing system and method for limited edition virtual objects. Representative examples utilizing many of these additional features and teachings, both separately and in combination, are described in further detail with reference to attached FIGS. 1-8. This detailed description is intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present system and method. Also, other methods and systems may be used.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

When playing video games in virtual worlds, there are often unique and trendy virtual objects that may be obtained or awarded. These virtual objects range from miniature versions of cars to swords, footballs, and the like. Additionally, there are times in video games or other virtual environments, when a user receives a medallion after accomplishing a level or a task within the video game. In our examples, a user may be awarded a trophy for completing an entire virtual game or virtual quest. Notably, these achievements, medallions, medals, or trophies only exists virtually within the game. One technological problem created by such "virtual only" collections is that since these are virtual objects, they may be lost forever if a user has their computer system hacked, the user is banned from the gaming platform, the gaming company goes bankrupt, or the game otherwise ceased to be accessible to the user. The present disclosure is directed towards a technological solution to this technological problem with a 3D printing system and method for printing virtual items that enables a user to transform these virtual objects into tangible objects in the real world.

Some embodiments of the 3D printing system and method for printing virtual items enable a user to 3D print the trophy or medal and display it in their room or gaming room in real life (i.e., IRL). Thus, embodiments of the 3D printing system and method for printing virtual items enables the user to show off their accomplishments in real life, and not just in a virtual trophy room when the user is logged onto the respective gaming system. Additionally, when virtual items are printed with a 3D printing system, then the user can display awards, trophies, and medals from different video games and virtual environments all in the same place. In contrast, in traditional virtual environments, the user would only be able to see each virtual awards or accomplishment in the virtual game, platform, or environment to which it was native.

In some embodiments, a 3D printing system and method for limited edition virtual objects is employed in conjunction with a video game as shown in FIGS. 1-4. In such embodiments, the user is playing a video game on a system (e.g., Xbox, PlayStation, Nintendo switch, phone, tablet, or the like) that is remote from the central platform. In another aspect of some embodiments, the video game has an assigned server or database that includes different items as rewards within the game for different accomplishments, unique items, or completing the game.

Referring now to FIG. 1, a screenshot is shown of an embodiment of a user 100 engaging in an activity in a virtual environment 120. This activity may be a video game or video tournament in some embodiments. In other embodiments, this activity is a non-gaming activity in a virtual environment such as, by way of example only and not by way of limitation, a learning activity, a training activity, a virtual building activity, an educational activity, or an occupational activity.

Figure 2:
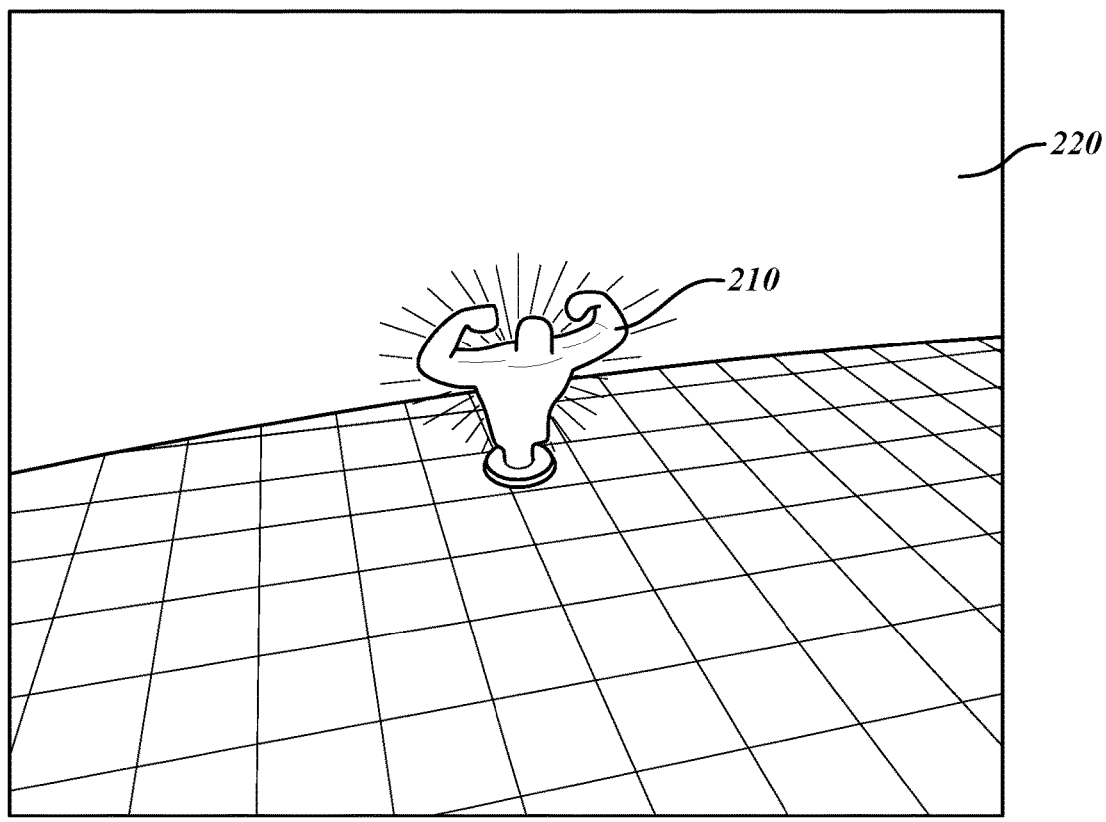
FIG. 2 illustrates an embodiment of a user finding a virtual item in a virtual environment 3D associated with a 3D printing system and method for limited edition virtual objects.

As shown in FIG. 2, a screenshot is displayed of an embodiment in which a user finds a virtual item 210 in a virtual environment 220 associated with a 3D printing system and method for limited edition virtual objects. In some embodiments, finding this virtual item 210 is part of a video game and represents an award or accomplishment. In other embodiments, the virtual item 210 is part of a non-gaming virtual environment 220 and is not related to a gaming award, but nonetheless may represent some type of accomplishment.

Figure 3:
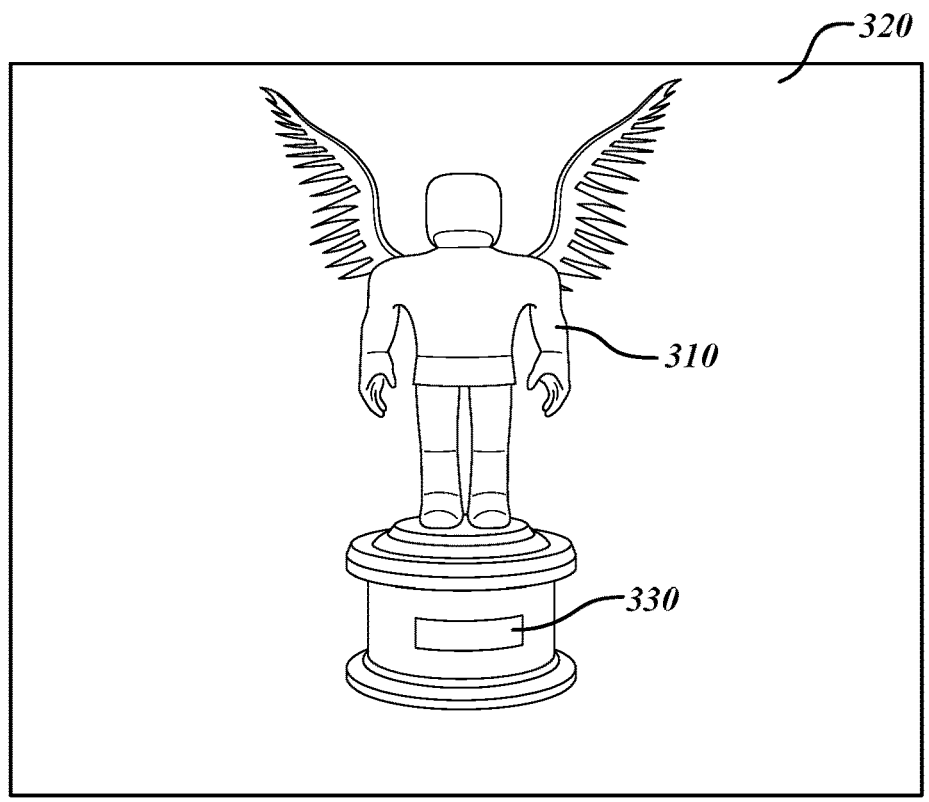
FIG. 3 illustrates a virtual trophy (e.g., a limited edition virtual object) acquired by a user from an activity in a virtual environment 3D associated with a 3D printing system and method for limited edition virtual objects.

Referring now to FIG. 3, a screenshot is shown of an embodiment of a virtual trophy 310 (e.g., a limited edition virtual object) acquired by a user from a video game activity in a virtual environment 320 associated with a 3D printing system and method for limited edition virtual objects. In the past, a user was only able to acquire such a virtual trophy 310 and keep it in the virtual game environment 320. However, embodiments of the 3D printing system and method for limited edition virtual objects enable this type of virtual trophy 310 to be 3D printed and saved in the real world outside of the virtual environment 320 in which it was won. This enables the user to have an awards display in the real world that are secure from cyber-hackers that might steal or otherwise delete the virtual trophy 310 or other limited edition virtual objects. This also enables the user to have an awards display trophy cabinet in the real world that is protected from a computer system crash of the user's computer system. In some embodiments, date, time, name of the player, and other relevant information 330 related to the award or accomplishment by the user is shown on the virtual trophy 310.

Figure 4:
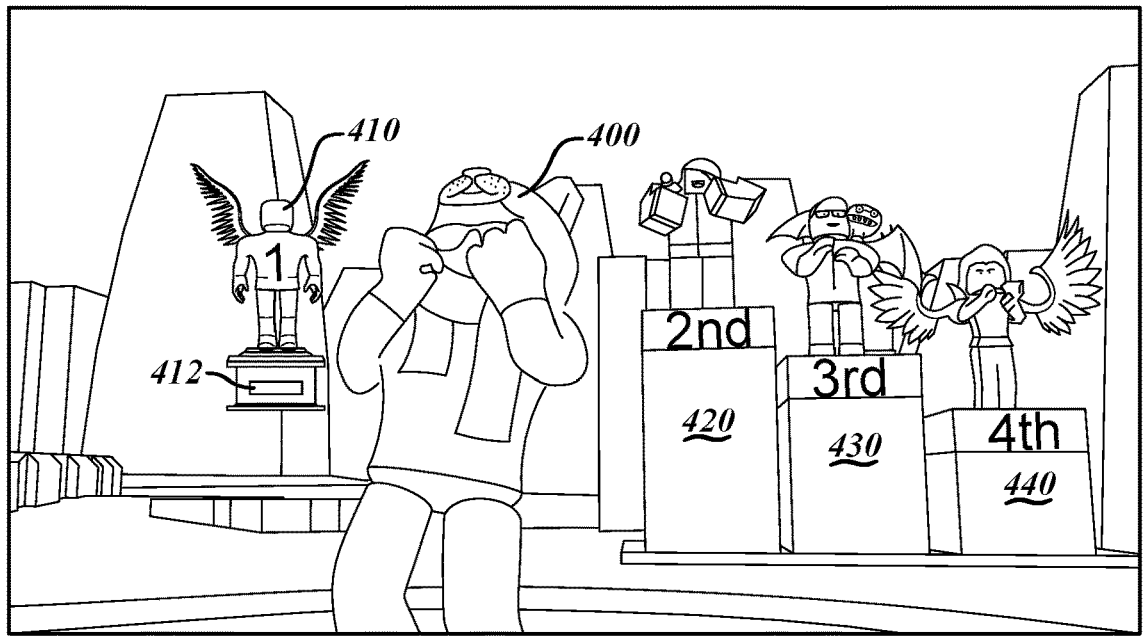
FIG. 4 illustrates a user winning a tournament and a virtual award for first place in a virtual environment 3D associated with a 3D printing system and method for limited edition virtual objects.
Figure 5:
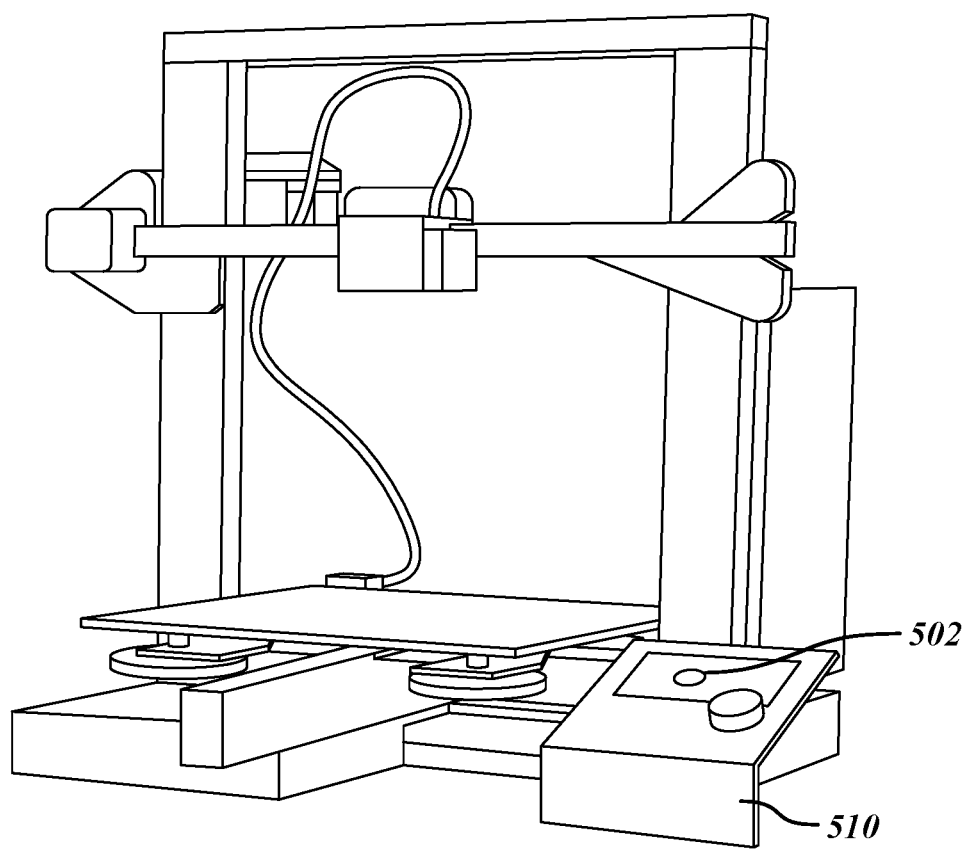
FIG. 5 illustrates a perspective view of a 3D printing system to which a 3D printer file of the limited edition virtual object is sent to a 3D printer to be printed.

As shown in FIG. 4, a screenshot is displayed of an embodiment of the 3D printing system and method for limited edition virtual objects in which a user 400 wins a tournament and a virtual award 410 for first place in a virtual tournament. In some such embodiments, the user is able to 3D print an award that includes a place (e.g., $1^{st}$ place 410, $2^{nd}$ place 420, $3^{rd}$ place 430, $4^{th}$ place 440, etc.) in the tournament, as well as potentially a date, time, and other relevant information 412 related to the tournament and the win by the user. All of this information 412 can be printed on the 3D printed physical version of the tournament award.

Figure 8:
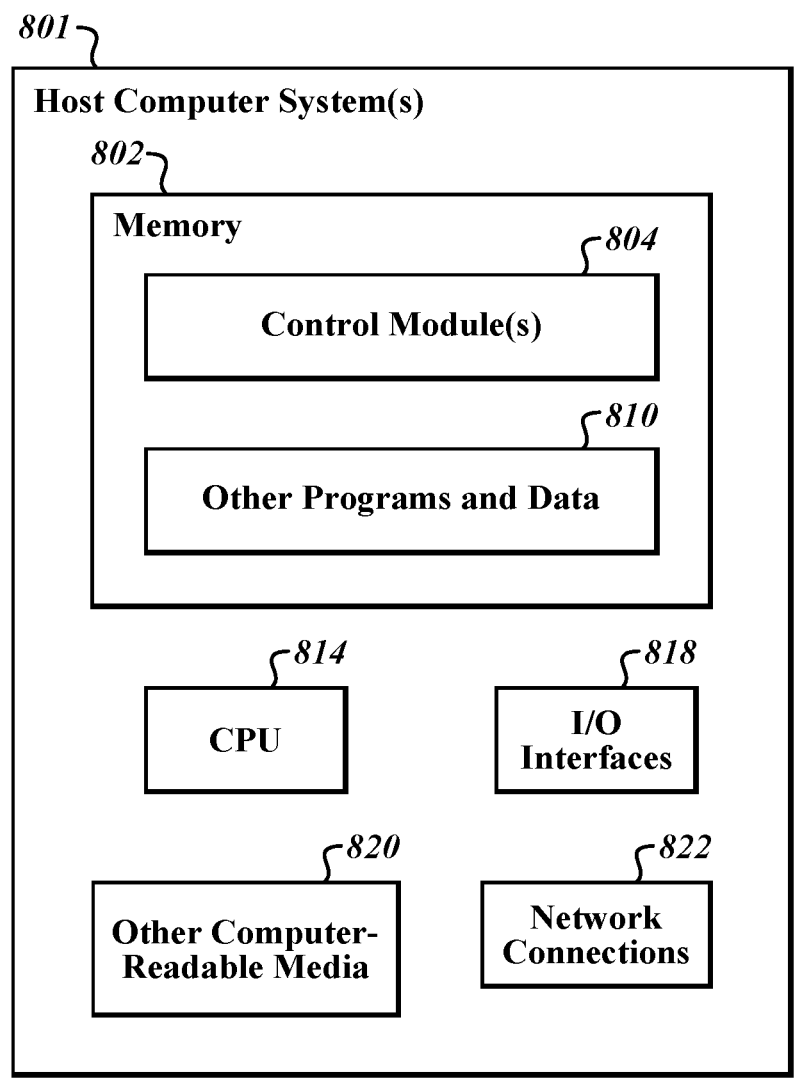
FIG. 8 illustrates a system diagram that describes an example implementation of a computing system(s) for implementing embodiments described herein.

For video game tournaments, virtual trophies 410, 420, 430 may be awarded to players for $1^{st}$ place through $3^{rd}$ place in one or more embodiments. In one example, the participants are playing an online tournament with each other. When participants place $1^{st}$, $2^{nd}$ or $3^{rd}$, they are each awarded a virtual trophy 410, 420, 430. The game program then communicates with the server 801 (or host computing system as shown in FIG. 8) that is hosting the tournament and requests that a 3D print file be sent for the virtual trophy that was won, potentially with the date, time, and name of the tournament to be printed on trophy in some embodiments. The 3D print file is then used by a 3D printer to print the real world 3D printed trophy from a virtual accomplishment for the user in real life.

In another aspect of the 3D printing system and method, medals, trophies, and other virtual items to be printed are virtually produced in a number of limited runs or batches, such as it is done with wine releases, rare books, and the like, e.g., 1/1, 5/5, 10/10, 100/100, or 250/250. Thus in such embodiments, there are only 1, 5, 10, 100, or 250 of these virtual items that may be potentially printed and owned in the real world.

Referring now to FIGS. 3, 5, 6, and 8, an embodiment of a 3D printing system is shown in which a 3D printer file 502 of the limited edition virtual object 310 is sent to a 3D printer 510 to be printed. The system for 3D printing of limited edition virtual objects may be used to safeguard against loss by account hacking or computer storage failure. In some embodiments, the computer system 801 includes a processor

814 and a memory 802 that is arranged to store computer instructions. The computer instructions are executable by the processor 814. In some embodiments, the computer instructions cause the processor 814 to enable a user to obtain a limited edition virtual object 310 associated with an activity of the user in a virtual environment. Additionally, the system is configured to receive a request from the user to 3D print the limited edition virtual object 310. Further, the system is configured to communicate with a server that stores the limited edition virtual object 310 associated with the activity of a user in the virtual environment. The system then prepares a 3D printer file 502 of the limited edition virtual object 310 requested by the user. Notably, the system employs technology, such as digital rights management, to prevent duplication of the 3D printer file 502 of the limited edition virtual object 310 requested by the user.

Figure 6:
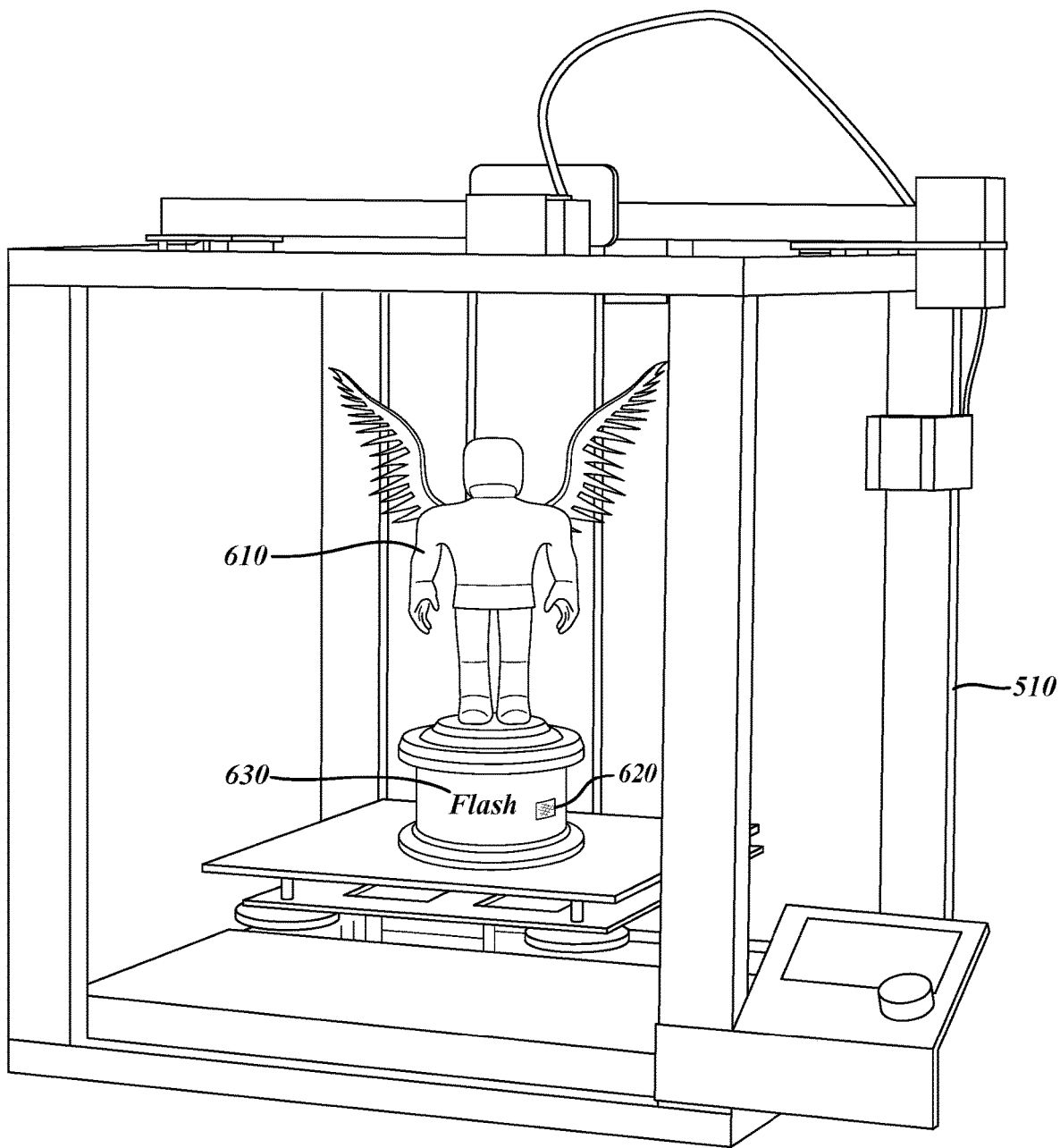
FIG. 6 illustrates a perspective view of 3D printing system that has printed the 3D printer file of the limited edition virtual object.

In some embodiments, the system sends the 3D printer file 502 of the limited edition virtual object 310 to a 3D printer 510 to be printed. In a subset of those embodiments, the system sends the 3D printer file 502 of the limited edition virtual object 310 to a 3D printer 510 that is part of the same system to be printed. In another subset of those embodiments, the system sends the 3D printer file 502 of the limited edition virtual object 310 to a 3D printer 510 that is part of a third party system to be printed. In still another subset of those embodiments, the system sends the 3D printer file 502 of the limited edition virtual object 310 to a 3D printer 510 that is owned by the user to be printed. As shown in FIG. 6, in one embodiment the 3D printing system has printed a 3D printed tangible physical item 610 from the 3D printer file of the limited edition virtual object 310, regardless of the location or the ownership of the 3D printer.

Moreover, in some embodiments of the 3D printing system and method for limited edition virtual objects, the system validates the authenticity of transformation of the limited edition virtual object 310 into the 3D printed tangible physical item 610. In some such embodiments, the system validates the authenticity of transformation by creating a non-fungible token of the limited edition virtual object 310 that is associated with the 3D printed tangible physical item 610. Non-fungible tokens are blockchain-based tokens each representing a unique asset such as digital content or artwork. A non-fungible token is a digital certificate of ownership and authenticity for a specific asset. Non-fungible tokens are cryptographically verifiable as well as easily transferable. Additionally, the origin and the current owner of the asset can be readily determined by leveraging cryptographic signatures that are native to the blockchain.

Additionally, in another aspect of some embodiments, the limited edition virtual objects 310 are tradeable as non-fungible tokens that specify if there are any 3D prints of the virtual item still available or if the non-fungible token is now only a virtual non-fungible token. Once traded in the marketplace, the non-fungible token then appears in the new owner's "trophy" room with or without the real world 3D printability associated with it, in some embodiments of the 3D printing system and method.

In still another aspect of some embodiments, the 3D printed tangible physical item 610 is printed with a bar code 620, such as a QR code, any of type of bar code, whether a matrix bar code, a one, two or three dimensional bar code, or other unique code that when scanned shows the current ownership of the non-fungible token associated with the 3D printed tangible physical item 610 as well as provides a link to the details of the game in which the award was won, including providing access to a recording of or showing a replay of the game. Thus, the term, bar code or QR code is used herein in the broadest sense to include any of these computer readable codes that are printed, displayed, shown on a screen or the like.

In some embodiments, the scanned bar code 620, whether a QR code 620 or other type of code provides a link or contacts to the server for that game's virtual items and their non-fungible tokens. The system then locates the username and enables the user that scanned the 3D printed physical item's QR code 620 to contact the owner of the non-fungible token on the non-fungible token marketplace and to purchase the non-fungible token associated with the 3D printed physical item 610.

In addition to having the option for a QR code 620 to be printed on the 3D printed physical item 610, in another aspect of some embodiments, the name of the player that accomplished the task (or found the item, or the like) is inserted into the 3D print file 502 so their name is printed on the physical item. Alternatively or additionally, the username is added into the non-fungible token so the item has the serial number along with the user that originally obtained the virtual item being displayed digitally. In such an embodiment, even if the non-fungible token is traded or sold in the marketplace, the non-fungible token may still be found within the server with a username search to see all of the non-fungible tokens obtained over a time period.

In yet another aspect of some embodiments, the 3D printed tangible physical item 610 can have printed thereon details associated with time, place, name of the player, ranking in the game, and number sequence information 630 that is printed on the 3D printed tangible physical item 610. In another aspect of some embodiments, the system validates the authenticity of transformation by associating the 3D printed tangible physical item 610 with a physical certificate. Notably, in some embodiments, the limited edition virtual object is limited to be only printable once into a 3D printed tangible physical item 610. In other embodiments, the limited edition virtual object is only printable a specific number of times into a 3D printed tangible physical item 610 other than one (e.g., two, five, ten, or the like).

The 3D printing system and method for limited edition virtual objects is not limited only to medals and trophies within games, it may also be used in conjunction with non-gaming virtual activities, such as virtual car racing and collecting. For example, a user that plays a driving or car video game and completed the tasks needed to obtain an F-1, a 911 Porsche, or Lamborghini within the virtual environment, may have a car room or garage instead of a Trophy room. Within that room, the virtual Porsche, F-1, or Lamborghini car would have the completion number assigned to it from the game server. In some embodiments, this completion number is printable on the car by the 3D printing system and method for limited edition virtual objects. In one or more embodiments, the user has the option to print the serial number under the car, on the roof, trunk, doors, or the hood. This 3D printing of the virtual car collection enables the user to have a shelf in the real world proudly displaying the serial-numbered cars that signify the user's accomplishments. In some embodiments, different scaled models are available for different accomplishments: $1^{st}$ place equals a $\frac{1}{16}^{th}$ scale model, $2^{nd}$ place through $5^{th}$ place equals a $\frac{1}{32}^{nd}$, and the like. Alternatively, in other embodiments, all car models are printed at the same scaled size with just the serial number being different.

Figure 7:
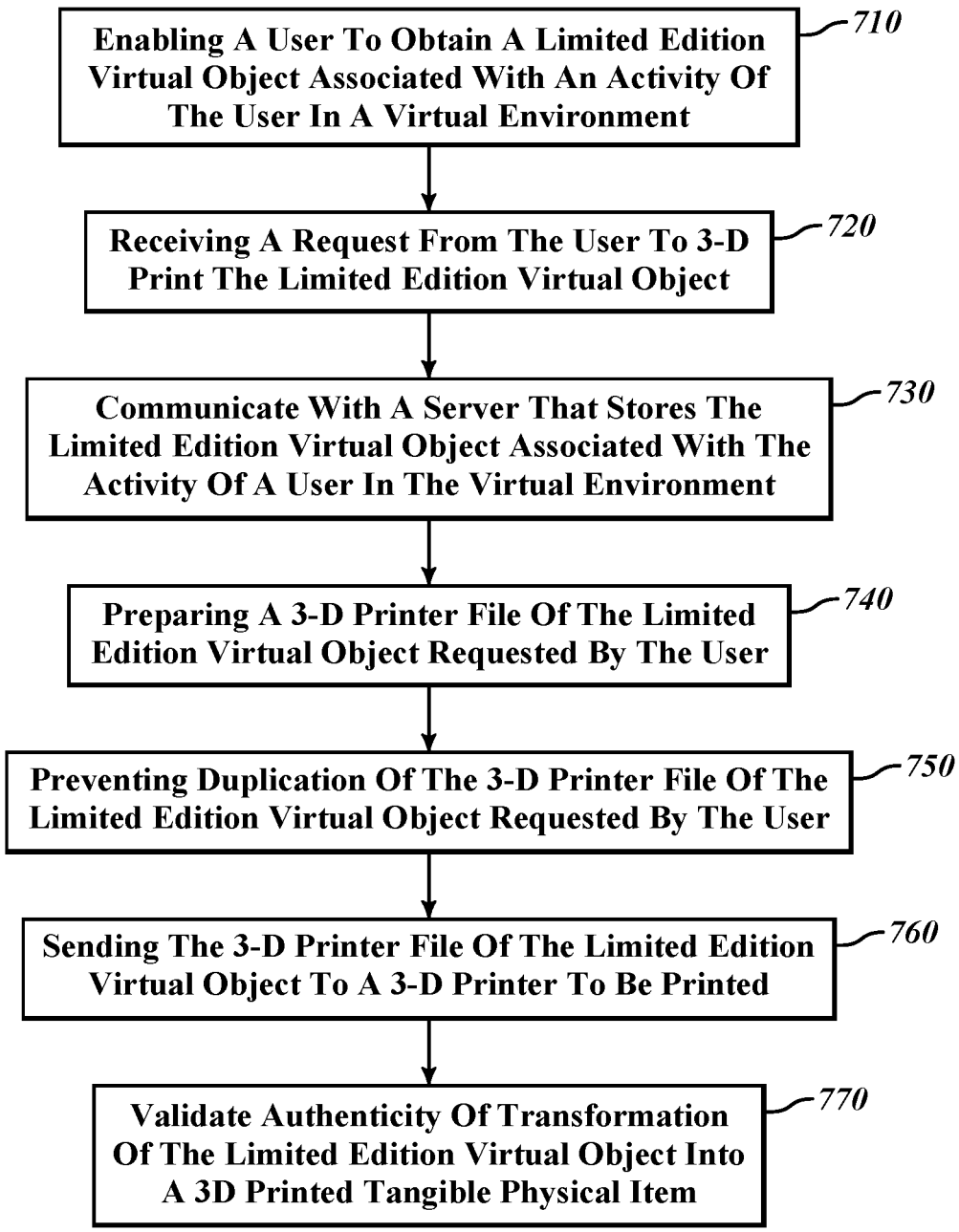
FIG. 7 illustrates a logic flow diagram for a method for 3D printing of limited edition virtual objects to safeguard against loss by account hacking.

FIG. 7 is a logic diagram showing a 3D printing system and method for limited edition virtual objects. As shown in FIGS. 3 and 5-8, at operation 710, the method includes enabling a user to obtain a limited edition virtual object 310 associated with an activity of the user in a virtual environment 320. At operation 720, the method includes receiving a request from the user to 3D print the limited edition virtual object 310. At operation 730, the method includes communicating with a server 801 that stores the limited edition virtual object 310 associated with the activity of a user in the virtual environment 320. At operation 740, the method includes communicating with a server 801 that stores the limited edition virtual object 310 associated with the activity of a user in the virtual environment 320. At operation 750, the method includes preventing duplication of the 3D printer file 502 of the limited edition virtual object 310 requested by the user. At operation 760, the method includes sending the 3D printer file 502 of the limited edition virtual object 310 to a 3D printer 510 to be 3D printed. At operation 770, the method includes validating authenticity of transformation of the limited edition virtual object 310 into a 3D printed tangible physical item 610.

Referring again to FIG. 8, when the user completes the first level of the game in one such embodiment, the game recognizes the completion of level 1, and provides the user a virtual medal on the screen to put in a trophy room of the video game. This level 1 medal may have a time stamp of the time and date that the user accomplished level 1. In some embodiments, the video game supported by the gaming system connects with the server 801 using a wired connection, while in other embodiments, the game supported by the gaming system connects with the server 801 using wireless connection. The server 801 logs the data and time that the user completes level 1. The database assigns the level 1 medal and a serial number to the user's virtual level 1 medal based upon the number of people that completed level 1 prior to this user. If zero people completed level 1 prior to this user, then the user obtains serial number #0001 assigned to his medal. In contrast, if 24 people had completed level 1 prior to the user completing level 1, the user's medal would be assigned #25 by the database/server.

In some embodiments, the 3D print file 502 is downloaded from a user's trophy room or a general game's trophy room and the 3D print file of the virtual trophy (or other limited edition virtual object) is sent to a 3D printer 510 to be printed. As described above, in some embodiments, Digital Rights Management or other security methods are employed to the 3D print files 502 so the trophies or medals are only able to be printed a limited number of times. In this manner, the uniqueness and scarcity of the trophies is reserved due to the limit on the #1 medals that are possible to be displayed by users in the physical world. Thus, the 3D printed trophies have integrity and uniqueness. As described above, users are not able to share the 3D print files with each other. Typically, the 3D print file prints only once. However, in some embodiments, after the print count is completed, the 3D print file disappears (e.g., self-deletes) in accordance with the settings of the video game.

FIG. 8 shows a system diagram that describes an example implementation of a computing system(s) for implementing embodiments described herein. The functionality described herein for a 3D printing system and method for limited edition virtual objects, can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that it is agnostic to the underlying cloud infrastructure, allowing higher deployment agility and flexibility.

In particular, shown is an example server or host computer system(s) 801. In some embodiments, one or more special-purpose computing systems may be used to implement the functionality described herein. Accordingly, various embodiments described herein may be implemented in software, hardware, firmware, or in some combination thereof. Host computer system(s) 801 may include memory 802, one or more central processing units (CPUs) 814, I/O interfaces 818, other computer-readable media 820, and network connections 822.

Memory 802 may include one or more various types of non-volatile and/or volatile storage technologies. Examples of memory 802 may include, but are not limited to, flash memory, hard disk drives, optical drives, solid-state drives, various types of random-access memory (RAM), various types of read-only memory (ROM), other computer-readable storage media (also referred to as processor-readable storage media), or the like, or any combination thereof. Memory 802 may be utilized to store information, including computer-readable instructions that are utilized by CPU 814 to perform actions, including those of embodiments described herein.

Memory 802 may have stored thereon control module(s) 804. The control module(s) 804 may be configured to implement and/or perform some or all of the functions of the systems, components and modules described herein for a 3D printing system and method for limited edition virtual objects. Memory 802 may also store other programs and data 810, which may include rules, databases, application programming interfaces (APIs), software platforms, cloud computing service software, network management software, network orchestrator software, network functions (NF), AI or ML programs or models to perform the functionality described herein, user interfaces, operating systems, other network management functions, other NFs, etc.

Network connections 822 are configured to communicate with other computing devices to facilitate the functionality described herein. In various embodiments, the network connections 822 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 818 may include a video interface, other data input or output interfaces, or the like. Other computer-readable media 820 may include other types of stationary or removable computer-readable media, such as removable flash drives, external hard drives, or the like.

Some methods, functions, steps, or features have been described as being executed by corresponding software by a processor. It is understood that any methods, functions, steps, features, or anything related to the systems disclosed herein may be implemented by hardware, software (e.g., firmware), or circuits despite certain methods, functions, steps, or features having been described herein with reference to software corresponding thereto that is executable by a processor to achieve the desired method, function, or step. It is understood that software instructions may reside on a non-transitory medium such as one or more memories accessible to one or more processors in the systems disclosed herein. For example, where a computing device receives data, it is understood that the computing device processes that data whether processing the data is affirmatively stated or not. Processing the data may include storing the received data, analyzing the received data, and/or processing the data to achieve the desired result, function, method, or step. It is further understood that input data from one computing device or system may be considered output data from another computing device or system, and vice versa. It is yet further understood that any methods, functions, steps, features, results, or anything related to the systems disclosed herein may be represented by data that may be stored on one or more memories, processed by one or more computing devices, received by one or more computing devices, transmitted by one or more computing devices, and the like.

The foregoing description, for purposes of explanation, uses specific nomenclature and formula to provide a thorough understanding of the disclosed embodiments. It should be apparent to those of skill in the art that the specific details are not required in order to practice the disclosure. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the disclosure to the precise forms disclosed, and those of skill in the art recognize that many modifications and variations are possible in view of the above teachings.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the breadth and scope of a disclosed embodiment should not be limited by any of the above described exemplary embodiments, but should be defined only in accordance with the following claims and their equivalents.

The invention claimed is:

1. A system comprising:
a memory arranged to store computer instructions, the computer instructions executable by a processor that cause the processor to:
enable a user to obtain a limited edition virtual object associated with an activity of the user in a virtual environment, wherein the limited edition virtual object is obtained as a result of an award or accomplishment in a virtual video game environment, wherein the award or accomplishment in the virtual video game environment is configured to be 3D printable into a 3D printed tangible physical item, and wherein the limited edition virtual object is configured to be 3D printable a threshold number of times;
receive a request from the user to 3-Dimension (3D) print the limited edition virtual object;
communicate with a server that stores the limited edition virtual object associated with the activity of a user in the virtual environment;
prepare a 3D printer file of the limited edition virtual object requested by the user;
prevent duplication of the 3D printer file of the limited edition virtual object requested by the user;
determine whether the total number of times that a 3D printer file representing the limited edition virtual object has been printed by a plurality of users exceeds the threshold number of times;
based on a determination that the total number of times does not exceed the threshold number of times:
send the 3D printer file of the limited edition virtual object to a 3D printer to be printed; and
validate authenticity of transformation of the limited edition virtual object into the 3D printed tangible physical item by creating a non-fungible token of the limited edition virtual object that is associated with the 3D printed tangible physical item and by associating the 3D printed tangible physical item with time, place, and number sequence information; and
based on a determination that the total number of times exceeds the threshold number of times:
prevent the 3D printer file of the limited edition virtual object from being sent to the 3D printer to be printed.

2. The system of claim 1, wherein duplication of the 3D printer file of the limited edition virtual object is prevented using digital rights management.

3. The system of claim 1, wherein the 3D printed tangible physical item is printed with a bar code that when scanned shows current ownership of the non-fungible token associated with the 3D printed tangible physical item.

4. The system of claim 1, wherein the system validates authenticity of transformation by associating the 3D printed tangible physical item with a certificate.

5. The system of claim 1, wherein the limited edition virtual object may only be printed once into a 3D printed tangible physical item.

6. A method comprising:
enabling a user to obtain a limited edition virtual object associated with an activity of the user in a virtual environment, wherein the limited edition virtual object is configured to be 3D printable a threshold number of times;
receiving a request from the user to 3-Dimension (3D) print the limited edition virtual object;
communicating with a server that stores the limited edition virtual object associated with the activity of a user in the virtual environment;
preparing a 3D printer file of the limited edition virtual object requested by the user;
preventing duplication of the 3D printer file of the limited edition virtual object requested by the user;
determining whether the total number of times that a 3D printer file representing the limited edition virtual object has been printed by a plurality of users exceeds the threshold number of times;
based on a determination that the total number of times does not exceed the threshold number of times:
sending the 3D printer file of the limited edition virtual object to a 3D printer to be printed; and
validating authenticity of transformation of the limited edition virtual object into a 3D printed tangible physical item, wherein the system validates authenticity of transformation by associating the 3D printed tangible physical item with a certificate and by associating the 3D printed tangible physical item with time, place, and number sequence information; and based on a determination that the total number of times exceeds the threshold number of times:

preventing the 3D printer file of the limited edition virtual object from being sent to the 3D printer to be printed.

7. The method of claim 6, wherein preventing duplication of the 3D printer file of the limited edition virtual object further comprises employing digital rights management of the 3D printer file of the limited edition virtual object.

8. The method of claim 6, further comprising creating a non-fungible token of the limited edition virtual object that is associated with the 3D printed tangible physical item.

9. The method of claim 8, further comprising:
printing a bar code of the 3-Dimension (3D) printed tangible physical item; and
displaying current ownership of the non-fungible token associated with the 3D printed tangible physical item when the Quick-Response (QR) code is scanned.

10. The method of claim 6, further comprising obtaining the 3D printer file of the limited edition virtual object as a result of an award or accomplishment in a virtual environment.

11. The method of claim 6, further comprising restricting the limited edition virtual object to only be printable once into the 3D printed tangible physical item.

12. A non-transitory computer-readable storage medium having computer-executable instructions stored thereon that, when executed by at least one processor, cause the at least one processor to cause actions to be performed, the actions including:

enable a user to obtain a limited edition virtual object associated with an activity of the user in a virtual environment, wherein the limited edition virtual object is obtained as a result of an award or accomplishment in a virtual video game environment, wherein the award or accomplishment in the virtual video game environment is configured to be 3D printable into a 3D printed tangible physical item, and wherein the limited edition virtual object is configured to be 3D printable a threshold number of times;

receive a request from the user to 3-Dimension (3D) print the limited edition virtual object;

communicate with a server that stores the limited edition virtual object associated with the activity of a user in the virtual environment;

prepare a 3D printer file of the limited edition virtual object requested by the user;

prevent duplication of the 3D printer file of the limited edition virtual object requested by the user;

determine whether the total number of times that a 3D printer file representing the limited edition virtual object has been printed by a plurality of users exceeds the threshold number of times;

based on a determination that the total number of times does not exceed the threshold number of times:

send the 3D printer file of the limited edition virtual object to a 3D printer to be printed; and validate authenticity of transformation of the limited edition virtual object into a 3D printed tangible physical item by associating the 3D printed tangible physical item with time, place, and number sequence information; and based on a determination that the total number of times exceeds the threshold number of times:

prevent the 3D printer file of the limited edition virtual object from being sent to the 3D printer to be printed.

13. The non-transitory computer-readable storage medium of claim 12, wherein the non-transitory computer-readable storage medium further causes the processor to create a non-fungible token of the limited edition virtual object that is associated with the 3D printed tangible physical item.

14. The non-transitory computer-readable storage medium of claim 13, wherein the 3D printed tangible physical item is printed with a Quick-Response (QR) code that when scanned shows that current ownership of the non-fungible token associated with the 3D printed tangible physical item.

* * * * *